J. FENSOM.
Elevators.
No. 151,014. Patented May 19, 1874.
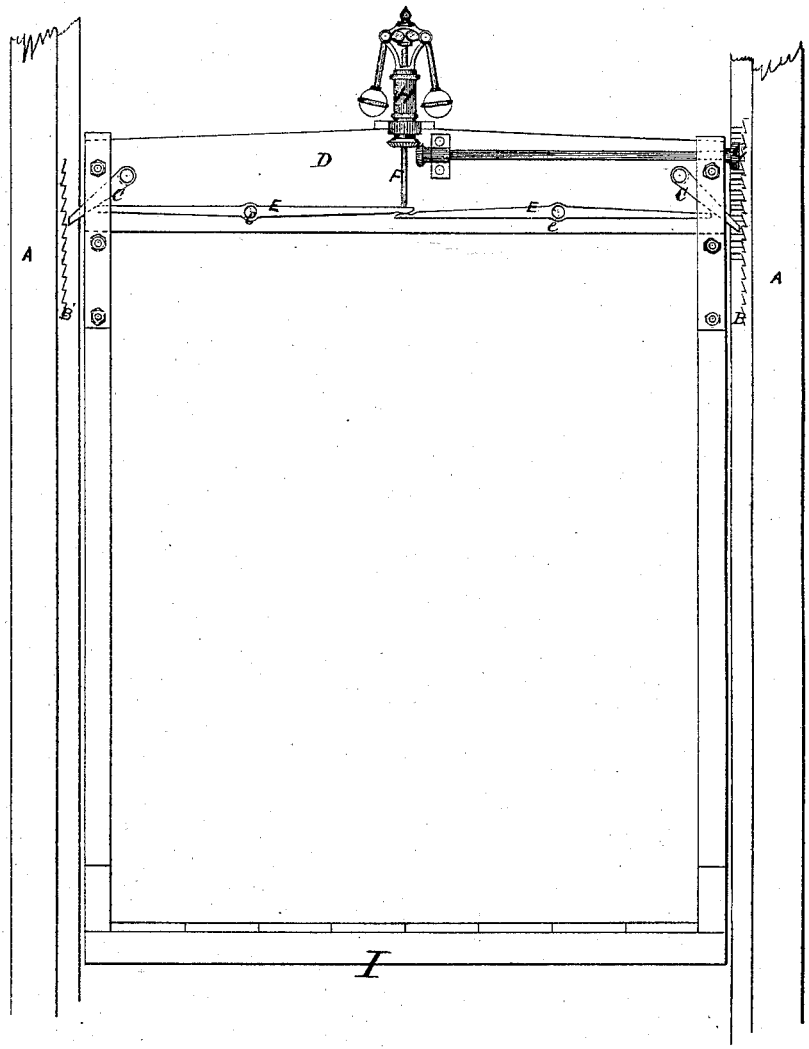

UNITED STATES PATENT OFFICE.

JOHN FENSOM, OF TORONTO, CANADA.

IMPROVEMENT IN ELEVATORS.

Specification forming part of Letters Patent No. 151,014, dated May 19, 1874; application filed October 20, 1871.

*To all whom it may concern:*

Be it known that I, JOHN FENSOM, of the city of Toronto, in the county of York and in the Province of Ontario, engineer, have invented a certain Improvement in Hoists or Elevators, of which the following is a specification:

My invention relates to an improved safety attachment for hoists; and consists in attaching, as hereafter described, to the cage of a factory or passenger hoist or elevator, a governor, driven by a pinion from a rack on one of the guide-posts, and actuating through levers properly balanced, two catches of which are securely pivoted to the cage opposite to each guide-post.

The whole are so arranged that should the cage attain a greater velocity than usual the two catches are forced into ratchet-racks fastened to each guide-post, and the cage remains suspended, as hereafter more fully described.

Figure 1, side elevation.

In all hoists or elevators with which I am familiar the safety-gear cannot be depended upon, being either too complicated or not attached in the proper position.

The machine which has been most generally adopted in the United States is arranged so that should the hoisting-rope break catches fly into ratchet-racks and prevent the cage falling; but should the driving-belt slip off, or any other accident occur, except the breaking of the rope, the safety attachment would not have the slightest effect, but would permit the cage to fall as though the hoisting-rope had broken.

There are other arrangements I am aware of for overcoming this difficulty, but they are all misapplied or too complicated to be of any use.

My safety attachment will not only prevent the cage falling should the hoisting-rope break, but will also support it should anything occur to the machinery which would otherwise cause it to fall.

A A are the two guide-posts. B is the ratchet-rack; B', the other ratchet-rack. $c$ $c$ are the catches, which are securely pivoted to the upper beam D, as shown. E E are the two levers fastened to the beam D by the two bolts $e$ $e$, which also act as fulcrums to the said levers. The inside ends of the levers E E overlap each other, and are touched at that point by the governor-rod F. The outside ends barely touch the catches $c$ $c$, as shown. The governor H is driven by the pinion G, working in the rack B. When the cage is ascending or descending at its usual speed, the governor H does not revolve sufficiently fast for the arms to fly out; but the moment the speed is increased, through any cause whatever, the governor-arms fly out, forcing the governor-rod F and the inside end of the levers E E down, and the said levers E E being pivoted on the bolts $e$ $e$, as shown, the outside ends move up, pressing out the catches $c$ $c$ till they are caught by the ratchet-racks B B. This movement is, of course, instantaneous, and the motion of the cage arrested immediately.

The mechanical details, such as material, size, manner of attaching the various parts together, &c., can, of course, be altered without affecting the principle of my invention; therefore, the manufacturers can alter these to suit their own taste.

When the weight to be lifted is very great, or there is any apprehension of the top beam D being torn away from the rest of the cage, I attach my safety-governor to the bottom I of the cage.

As I maintain the same combination of levers, &c., and do not claim any peculiar arrangement for applying it in this manner, it is unnecessary to illustrate it in this position. Any mechanic will understand how to attach it.

What I claim as my invention is—

The governor-spindle F, arranged to operate directly upon the levers E, in combination with the said levers, pawls C, and rack B, substantially as herein set forth.

JOHN FENSOM.

Witnesses:
HENRY JOSEPH,
DONALD C. RIDOUT.